March 29, 1932.  H. L. JOHNSTON  1,851,583
FOOD HANDLING APPARATUS
Filed Aug. 1, 1927    2 Sheets-Sheet 1

INVENTOR
Herbert L. Johnston
BY
Maréchal & Noe
ATTORNEYS

March 29, 1932.   H. L. JOHNSTON   1,851,583
FOOD HANDLING APPARATUS
Filed Aug. 1, 1927    2 Sheets-Sheet 2
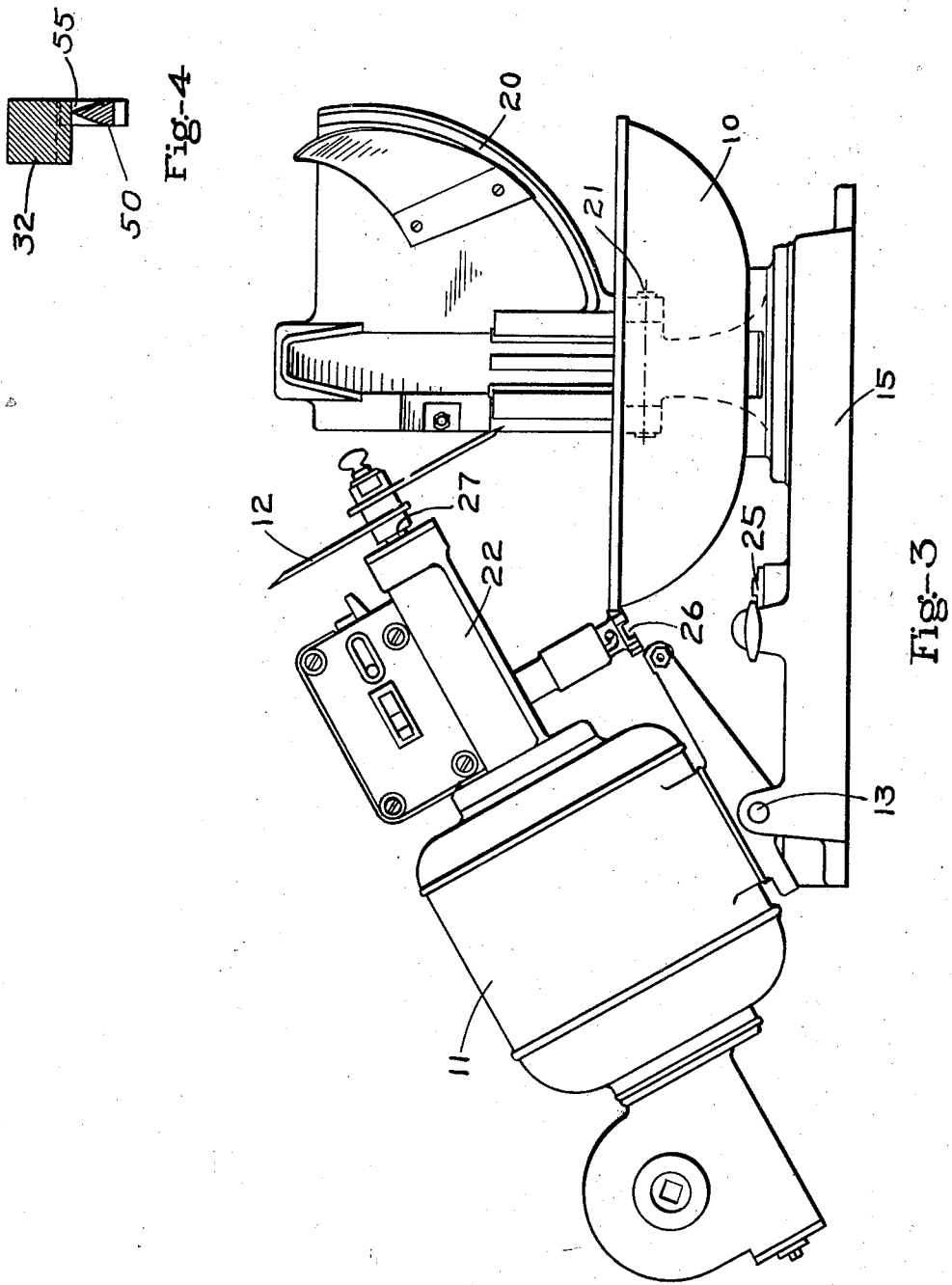
INVENTOR
Herbert L. Johnston
BY
Mareckal & Noe
ATTORNEYS Patented Mar. 29, 1932

1,851,583

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO

FOOD HANDLING APPARATUS

Application filed August 1, 1927. Serial No. 209,914.

This invention relates to motor driven food handling apparatus and more particularly to cutting machines of this character.

One of the principal objects of the invention is the provision of motor driven food handling apparatus in which danger to the operator is minimized, which may be safely and easily operated, and which is simple in construction.

A further object is the provision of a safety feature for motor-driven cutting apparatus in which exposure of the cutter is prevented at the time it is rotated by the motor.

Other objects of the invention will be apparent from the following description and from the drawings.

In the drawings, in which like character of reference designate like parts in the several views—

Fig. 3 is a side elevation of the entire motor driven apparatus; and

Fig. 4 is a section on the line 4—4 of Fig. 1, but corresponding to the latched position of the interlock member.

Figure 2:
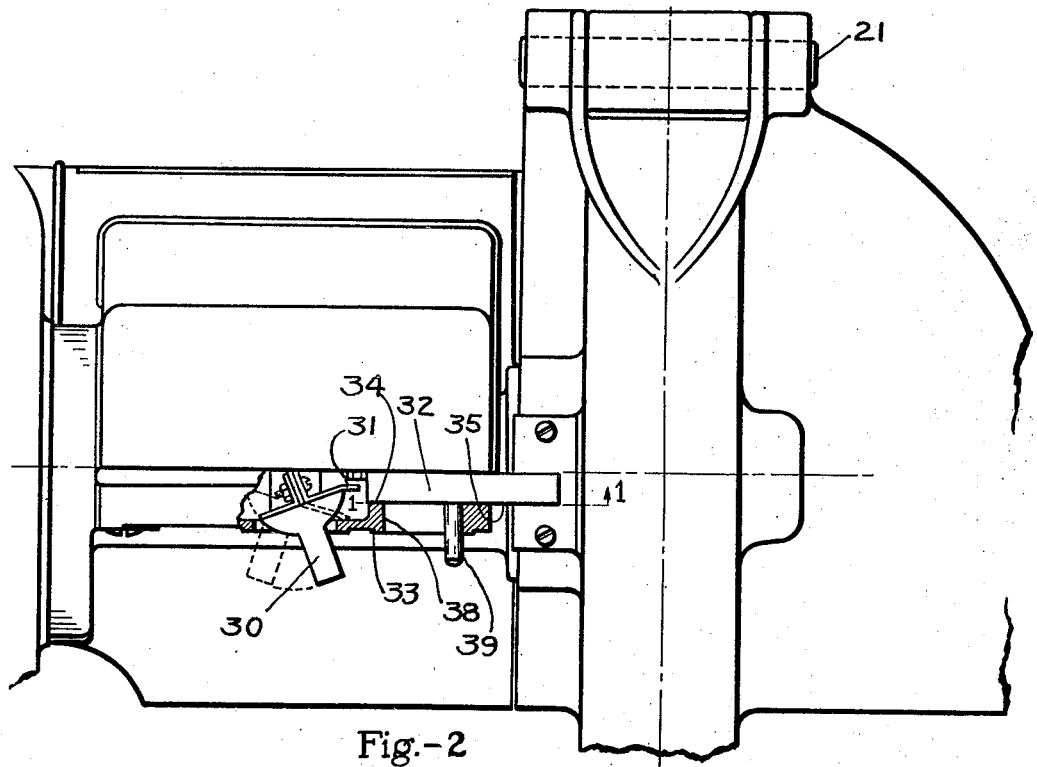
Fig. 2 is a top plan view of the parts shown in Fig. 1.

In the drawings one embodiment of the invention is shown as adapted to motor driven food cutting apparatus of the type and of the construction as generally set forth in my prior application for Letters Patent Serial No. 675,197 entitled Apparatus for preparing foodstuffs, filed November 16, 1923. It will be apparent however that the invention can be used in conjunction with other similar motor driven apparatus and it is not intended that the scope of the invention should be restricted to the precise construction illustrated.

The apparatus includes generally a container mechanism including a bowl or container 10 adapted to receive meat, vegetables or other foodstuffs, and a motor designated 11 positioned adjacent thereto and driving or rotating suitable cutting knives 12 which operate within the bowl, the two being so mounted with relation to each other that they may be relatively moved to withdraw the knives out of the bowl and permit access thereto. Preferably the container and motor are both mounted upon a common base 15, the motor, as shown, being pivoted at a point 13 on the base adjacent and below the center of gravity so that the motor assembly may be tilted to withdraw the knives from their operative position within the bowl.

The container also includes in addition to the bowl 10 a top enclosure section or cover part 20 which may be hinged at one side of the bowl as indicated at 21 and which is of such shape that when the motor assembly is in its operative cutting position the enclosure section 20 may be lowered about its hinged axis to form a closure together with the housing 22 of the motor assembly and thus cover at least part of the bowl and protect the operator from the rotatable knives and also retain the food within the bowl.

The bowl 10 may be made rotatable and for this purpose suitable driving gears may be mounted within the base 15 and connected to be driven by the clutch or transmission member 25. This clutch member is adapted to be engaged when the motor assembly is in operative cutting position by a driving clutch member 26 supported from the housing 22 of the motor assembly and suitably connected to the motor drive shaft 27 as more particularly set forth in my prior application referred to. Thus when the motor assembly is moved so that the knives are in their cutting position within the bowl the members 25 and 26 are engaged and power is transmitted from the motor shaft to cause the rotation of the bowl as the cutter is revolved therein.

In order to prevent the possibility of any injury to the operator and to make the apparatus as perfectly fool-proof as possible, means is provided which prevents the cutters or knives from being rotated by the motor unless the cover section is in its lowered protective position. As more clearly shown in Figs. 1 and 2 the housing 22 supports an electric starting and stopping switch 30 which may be manually operated from the position shown in full lines in Fig. 2 in which the motor is running, to the position shown in dotted lines in that figure in which the motor is stopped. It will be noted that when the switch 30 is in the "on" position shown in full lines the part 31 of the switch is in the path of movement of a sliding interlock member 32 which is guided to slide within the housing 22. The side plate 33 of the housing 22 which may be attached in place by suitable screws 36, has a rear surface 34 against which the side face 35 of the lock member 32 slides, this portion of the side plate 33 having a slot 38 in which a pin 39 may be moved. This pin 39 is fixed to the side 35 of the lock member 32 and projects to the exterior of the side plate 33 so that it may be manually moved from the position shown in Figs. 1 and 2 if the switch is in the dotted line position and the motor stopped. When the interlock member 32 is in the position shown in Figs. 1 and 2 its outer end 40 overlies a portion of the cover part 20 such as the flange 41 which is preferably provided with an adjustable screw member 42 threaded in the flange 41 and locked in adjusted position by a nut 43. When the cover part 20 is in its normal operating position closing over the cutters, the interlock member 32 in the normal position shown in Figs. 1 and 2 will thus prevent opening movement of the cover part 20 and thus prevent the exposure of the cutting knives. It will thus be apparent that before the operator can open the movable part or cover section of the container mechanism 20 he must first push the interlock member 32 to the left as viewed in these figures by pressing against the pin 39. However, he cannot do this unless the switch 30 by which the motor is started, is in its dotted line position corresponding to the stopped position of the motor; so he is compelled to stop the motor by suitable operation of the switch before he can move the interlock member 32 to release the cover part 20.

Figure 1:
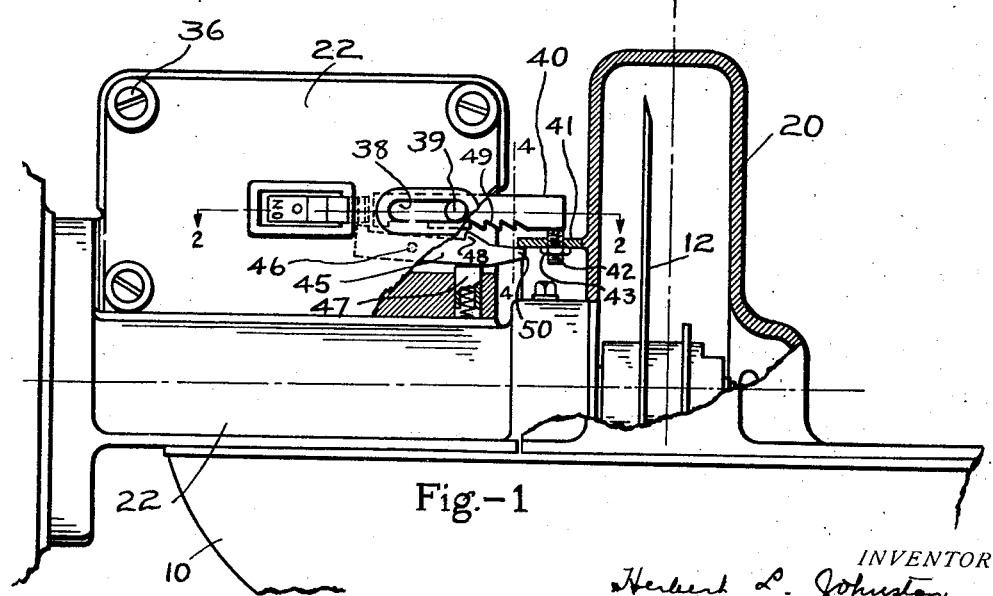
Fig. 1 is a side elevation showing the safety feature of the present invention, parts being broken away and shown in section.

The interlock member 32 having been moved to the left, the operator lifts the cover part 20. As soon as the cover part is lifted a latch 45 pivoted at 46 in the housing 22 is pressed by a spring pressed plunger 47 so that its latch point 48 is moved upwardly into engagement with the series of notches 49 provided on the bottom surface of the interlock member 32. The latch 45 has a projecting nose 50 extending outside of the housing 22 and positioned immediately below the interlock member 32 and extending sufficiently far so that it may be engaged by the end of the flange 41 of the cover part 20, when this cover section is in its normal closing position as shown in Figs. 1 and 2. In this position then the flange on the cover is in engagement with the nose 50 of the latch so that the latter is held out of engagement with the interlock member, but as soon as the housing section is opened after the interlock member has been moved to the left the latch 45 is released from its engagement with the flange 41 of the cover 20 and the interlock member 32 will be held in its inner position until the cover section 20 is again closed.

After the opening of the cover 20 the motor assembly may be swung about the pivot point 13 so that the knives are withdrawn from their operative position within the bowl and thus access is permitted to the interior of the bowl for the removal of the foodstuffs or for cleaning purposes. The knives in this position are exposed so that it is important that they be maintained stationary at this time. When the cover section 20 is in its open position the interlock member 32 is at the extreme left of its movement and in this position the operator is prevented by the latch 45 from moving the switch 30 to the full line position shown in Fig. 2 so that it is impossible for him to start the motor. Consequently the cutting knives must remain stationary and danger of cutting the operator is minimized. The construction of the interlock and safety parts of the invention are such that manual starting of the motor when the knives are exposed is rendered as difficult as possible so that the machine will be fool-proof. For this purpose the interlock member 32 is made rather wide as shown in Fig. 2 and its projecting end is immediately over the projecting nose 50 of the latch member 45, and furthermore, this nose 50 as shown in Fig. 4 has a sharp upper edge 55. Thus the small space between nose 50 and member 32 and the sharp upper surface or knife edge on the nose 50 makes it as difficult as possible for the operator to press the exposed nose of the latch member down to release the interlock member 32 when the cover 20 is open. He is thus prevented from starting the operation of the motor by closing the starting switch 30 when the cutting knives are exposed and in dangerous position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a motor driven cutting apparatus of the class described, a cutter, a motor for operating said cutter, a movable cutter cover, a motor starting switch, means movable separately from said motor starting switch to a position preventing operation of the switch to start the motor, said means normally overlying a portion of said cutter cover to prevent movement of said cutter cover from its normal position covering said cutter.

2. In a motor driven food cutting apparatus of the class described, a cutter, a motor for operating said cutter, a movable container part, a motor starting switch, and a member movable separately from said manually switch and said container part from a position preventing movement of said container part to a position preventing movement of said switch.

3. In a motor driven cutting apparatus of the class described, a cutter, a motor for operating said cutter, a movable container part, a motor starting switch, lock means movable to prevent operation of the switch to cause the starting of the motor, said means normally preventing movement of said container part from its normal position, latch means for holding said lock means in position preventing motor starting movement of said switch, and means on said movable container part for releasing said latch means.

4. In a motor driven cutting apparatus of the character described, a cutter, a motor for operating said cutter, a movable cutter cover, a motor control switch, lock means positioned to prevent movement of said cutter cover from its protective position enclosing the cutter when said motor control switch is closed, said parts being constructed to prevent movement of said lock means to cover releasing position as long as said motor control switch is closed.

5. In a motor driven apparatus of the class described, a revoluble member, an electric motor for revolving said member, a movable container part for protecting said member, a motor starting switch, a shiftable member manually movable from a position in the path of movement of said container part to a position preventing motor starting movement of said switch, and latch means holding said member in position preventing motor starting movement of said switch, said latch means being positioned relatively inaccessible for manual operation.

6. In a motor driven apparatus of the class described, a food container bowl, a revoluble member in said bowl, an electric motor for operating said member, a movable cover part, a manually operable motor starting switch, a slide adapted to be manually operated from a position preventing movement of said cover part to a position preventing motor starting movement of said switch, latch means for holding said slide in the latter position, said latch means being positioned close to said slide to prevent a finger of the operator from being inserted between the latch means and slide and presenting a sharp upper surface adapted to be depressed by closing movements of said cover part to permit the release of said slide.

7. In food handling apparatus of the character described, having a container mechanism with a movable container part, a food treating member normally covered within said container mechanism by said container part, and an electric motor having a motor circuit control switch for driving said food treating member; a manually operable member mounted for relative movement with respect to said movable container part and said motor control switch, said member in one position of its movement preventing movement of said movable container part from its normal operating position covering said food treating member while permitting actuation as desired of said motor control switch, and in another position of its movement preventing movement of said motor control switch to motor circuit closing position while permitting actuation as desired of said movable container part.

8. In food handling apparatus of the character described, having a container mechanism with a movable container part, a food treating member normally covered within said container mechanism by said container part, and an electric motor having a motor circuit control switch for driving said food treating member; a manually operable member mounted for relative movement with respect to said movable container part and said motor control switch, said member in one position of its movement preventing movement of said movable container part from its normal operating position covering said food treating member while permitting actuation as desired of said motor control switch, and in another position of its movement preventing movement of said motor control switch to motor circuit closing position while permitting actuation as desired of said movable container part, and latch means for holding said manually operable member in said latter position, said latch means being automatically releasable upon movement of said movable container part to its normal operating position.

9. In food handling apparatus of the character described, having a container mechanism with a movable container part, a food treating member normally covered within said container mechanism by said container part, and an electric motor having a motor circuit control switch for driving said food treating member; a manually operable member mounted for relative movement with respect to said movable container part and said motor control switch, said member in one position of its movement preventing movement of said movable container part from its normal operating position covering said food treating member while permitting actuation as desired of said motor control switch, and in another position of its movement preventing movement of said motor control switch to motor circuit closing position while permitting actuation as desired of said movable container part, and latch means for holding said manually operable member in said latter position, said latch means being constructed and arranged to render difficult manual actuation thereof to release position.

10. In food handling apparatus of the character described, having a container mechanism with a movable container part, a food treating member normally covered within said container mechanism by said container part, and an electric motor having a motor circuit control switch for driving said food treating member; a manually operable member mounted for relative movement with respect to said movable container part and said motor control switch, said member in one position of its movement preventing movement of said movable container part from its normal operating position covering said food treating member while permitting actuation as desired of said motor control switch, and in another position of its movement preventing movement of said motor control switch to motor circuit closing position while permitting actuation as desired of said movable container part, latch means for holding said manually operable member in said latter position, spring means for urging said latch means into holding position, and means movable with said movable container part for automatically releasing said latch means when said movable container part is moved to its normal operating position.

11. In food cutting mechanism of the character described, having a rotatable container with a pivoted cover, a cutting knife mounted for rotation within said container and normally covered by said cover, and an electric motor having a motor circuit control switch for rotating said cutting knife and container; a manually operable interlock relatively movable between said switch and said cover, said interlock being movable from a position in which it overlies a cooperating part of said cover and prevents movement of the cover to a position exposing said knife, to a second position in which the interlock cooperates with said switch to prevent movement thereof to a position closing said motor circuit, the movement of said interlock from said one position to said second position being prevented so long as said switch is in motor circuit closing position.

12. In food handling apparatus of the character described, having a container with a movable cover portion, a food treating member normally covered within said container by said cover portion, and an electric motor having a motor circuit control switch for driving said food treating member; a member mounted for relative movement with respect to said cover portion and said motor control switch, said member in one position of its movement preventing movement of said cover portion from its normal position covering said food treating member, and in another position of its movement preventing movement of said motor control switch to motor circuit closing position while providing for movement of said cover portion, and means for latching said member in one of said positions.

In testimony whereof I hereto affix my signature.

HERBERT L. JOHNSTON.